United States Patent
Belleville

(10) Patent No.: US 8,831,131 B2
(45) Date of Patent: Sep. 9, 2014

(54) METHOD AND DEVICE FOR ASYNCHRONOUS COMMUNICATION OF DATA ON A SINGLE CONDUCTOR

(75) Inventor: Marc Belleville, Saint-Egreve (FR)

(73) Assignee: Commisariat a l'Emergie Atomique et aux Energies Alternatives, Paris (FR)

( * ) Notice: Subject to any disclaimer, the term of this patent is extended or adjusted under 35 U.S.C. 154(b) by 286 days.

(21) Appl. No.: 13/293,008

(22) Filed: Nov. 9, 2011

(65) Prior Publication Data
US 2012/0131242 A1    May 24, 2012

(30) Foreign Application Priority Data

Nov. 19, 2010 (FR) ...................... 10 59565

(51) Int. Cl.
*H04L 25/34* (2006.01)
*G06F 13/42* (2006.01)

(52) U.S. Cl.
CPC ................................ *G06F 13/4286* (2013.01)
USPC ............................. 375/288; 375/286; 375/287

(58) Field of Classification Search
CPC ... H04L 12/40039; H04L 12/403; H04L 1/22; H04L 7/0331
USPC ................... 375/288; 710/61, 106, 315, 307; 370/218, 329
See application file for complete search history.

(56) References Cited

U.S. PATENT DOCUMENTS

| | | | | |
|---|---|---|---|---|
| 7,149,168 B2* | 12/2006 | Kamon | ...................... | 369/47.53 |
| 8,161,224 B2* | 4/2012 | Laurencin et al. | ............ | 710/315 |
| 8,199,849 B2* | 6/2012 | Oh et al. | ........................ | 375/286 |
| 2004/0039963 A1* | 2/2004 | Burch | .............................. | 714/25 |
| 2004/0208200 A1* | 10/2004 | Hejdeman et al. | ............. | 370/476 |

FOREIGN PATENT DOCUMENTS

EP      1696621 A1      8/2006

\* cited by examiner

*Primary Examiner* — Dhaval Patel
(74) *Attorney, Agent, or Firm* — Baker & Hostetler LLP

(57) ABSTRACT

The invention relates to the asynchronous communication of data in complex integrated systems, be it inside integrated circuit chips or between integrated circuit chips, for example in a compact stack of chips. According to the invention, the transmission is done on a single conductor of exchanges. The data are transmitted on this conductor in the form of at least three levels of potential, the first level representing a first value of data item transmitted, the second representing a second value of data item transmitted, and the third representing an inactive level. An acknowledgment signal is transmitted on the same exchange conductor as the data. This signal is preferably sent by the receiver in the form of the forcing of the exchange conductor by the receiver to the inactive potential level, the sender detecting this forcing.

9 Claims, 6 Drawing Sheets

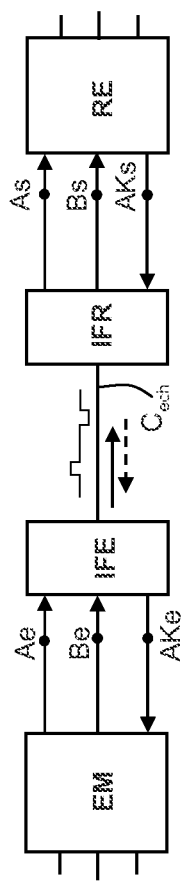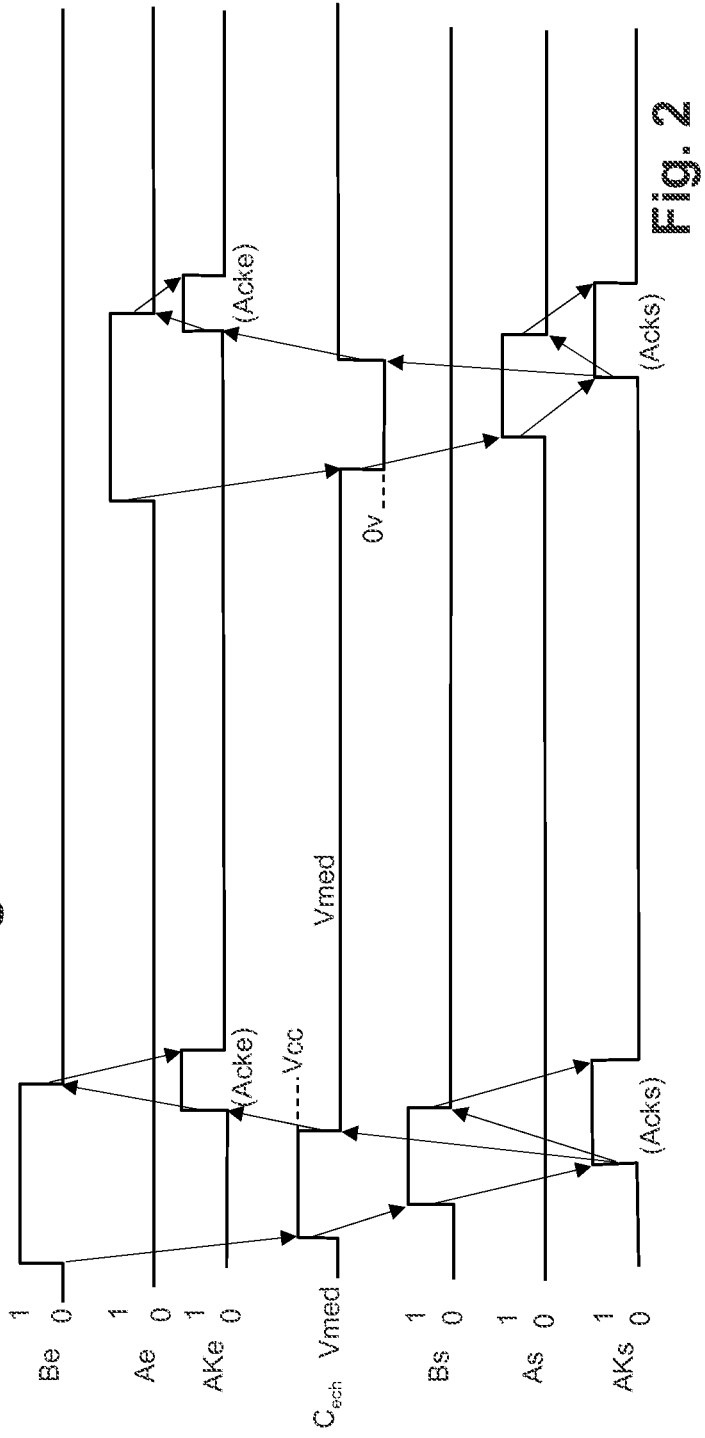

METHOD AND DEVICE FOR ASYNCHRONOUS COMMUNICATION OF DATA ON A SINGLE CONDUCTOR

CROSS-REFERENCE TO RELATED APPLICATION

This application claims priority to foreign French patent application No. FR 1059565, filed on Nov. 19, 2010, the disclosure of which is incorporated by reference in its entirety.

FIELD OF THE INVENTION

The invention relates to the communication of data in complex integrated systems, be it inside integrated circuit chips or between integrated circuit chips, for example in a compact stack of chips.

BACKGROUND

One of the problems which arises is the complexity and the power consumption of the very numerous interconnections between circuit elements.

A second problem, related to the complexity and to the variations in advanced technologies, is the great difficulty of obtaining synchronous operation (that is to say using one and the same clock domain) in a complete circuit and/or in a stack of circuits. This difficulty has prompted teams to propose architectures either of "Globally Asynchronous, Locally Synchronous" (GALS) type, in which the long-range communications are performed in an asynchronous manner, or that are totally asynchronous (the data senders and receivers manage between themselves the transmission of data without a central facility determining the instants of exchanges for all).

For the sender, the asynchronous communication consists in sending a data item only if it has received beforehand an acknowledgment signal on the part of the receiver, showing that the receiver has already recorded a previous data item and is available to receive another one.

Typically, a robust asynchronous communication, of the type that is quasi-insensitive to lags, intended to transmit binary information bits 0 and 1, uses three conductors. A first conductor is reserved for the transmission of the "0"s: it transmits a pulse when it has to dispatch a 0 and then reverts to its quiescent level where it remains until it has to transmit a 0 again. A second conductor is reserved for the transmission of the "1"s; it transmits a pulse when it has to dispatch a 1 and it reverts to its quiescent level until it has to transmit a 1 again. Finally, a third conductor is intended to transmit an acknowledgment signal from the receiver to the sender. This acknowledgment signal is a pulse dispatched when the receiver has recorded a data item; the sender uses this signal to return the conductor which transmitted the data item to its quiescent level. A drawback of asynchronous communications is therefore the use of a larger number of conductors than for synchronous communications. This point is particularly sensitive in the case of a stack of chips, interconnected vertically by through vias, the latter occupying a significant area of silicon.

To reduce the number of conductors, it has already been proposed to work in ternary mode and to transmit the 1s and also the 0s on a single conductor. The conductor is at an intermediate quiescent potential level Vmed as long as it is not transmitting a data item. The sender causes this potential to switch to a higher level Vhigh to transmit a 1, or to a lower level Vlow to transmit a 0. The receiver detects a change of level, determines the data item as a function of the direction of the change, and dispatches an acknowledgment signal on the conductor reserved for this use.

SUMMARY OF THE INVENTION

The invention proposes a method for further reducing the number of conductors in an asynchronous communication.

According to the invention, there is proposed a method of data transfer by asynchronous link with transmission of a data item from a sender to a receiver followed by an acknowledgment signal in return from the receiver to the sender, in which the data are transmitted on an exchange conductor in the form of at least three levels of potential which are a first active level representing a first value of data item transmitted, a second active level representing a second value of data item transmitted and a third inactive level or standby level, characterized in that the acknowledgment signal is transmitted on the same exchange conductor as the data.

Thus, a single conductor is used for the transmission of the data in an asynchronous manner.

The acknowledgment signal is preferably produced by the receiver in the form of the forcing of the exchange conductor by the receiver to the inactive potential level. The sender detects this level and interprets it as an acknowledgment signal.

Preferably, the asynchronous transmission protocol comprises the following successive operations: sending by the sender of a data item on the exchange conductor in the form of a forcing of the exchange conductor to an active potential level; relaxation of the forcing by the sender (preferably immediately upon the obtaining of a well established active level on the exchange conductor); detection of the active level by the receiver; forcing of the exchange conductor to the inactive level by the receiver, the switching of the exchange conductor from an active level to the inactive level constituting the acknowledgment signal; relaxation of the forcing by the receiver (preferably immediately upon the obtaining of the correct inactive level on the exchange conductor); detection by the sender of the switching of the exchange conductor to the inactive level.

The sender uses the detection of the inactive level, notably to prepare the sending of a new data item.

The expression "forcing of the exchange conductor" is understood to mean that the sender or the receiver imposes a potential on the exchange conductor; relaxation of this forcing is understood to mean that the sender or the receiver leaves this potential free to be forced by the other side (receiver or sender respectively) of the exchange conductor. Relaxation consists in placing the exchange conductor at high impedance, or else in holding it at its potential by a weak holding circuit (for example a small transistor) whose holding action may be easily annihilated by the other end of the exchange conductor (for example by a bigger transistor).

After the receiver has forced the exchange conductor to the inactive level, provision is preferably made for the receiver to detect this new state of the exchange conductor and for this detection to serve to trigger the relaxation of the forcing by the receiver.

The detection by the sender of the switching of the exchange conductor to the inactive level serves for its part to disable the data item previously applied, with a view to preparing the possible transmission of a new data item.

This method may be implemented between: a sender which conventionally possesses two binary data outputs, one for transmitting the 1s, the other for transmitting the 0s, and an input for receiving an acknowledgment signal; and a receiver which conventionally possesses two binary data inputs, one for receiving the 1s, the other for receiving the 0s, and an output for sending an acknowledgment signal.

In this case, a send interface circuit is interposed between the sender and the exchange conductor; and likewise a receive interface circuit is interposed between the exchange conductor and the receiver.

The send interface circuit comprises two inputs for the reception of data to be transmitted, an acknowledgment output for sending an acknowledgment signal, and a data output intended to be linked to an exchange conductor so as to transmit the data and receive an information item regarding acknowledgment on the part of a receiver, a first control circuit linked to the first input for forcing the data output to a first active potential level upon the receipt of a first data item to be transmitted, a second control circuit linked to the second input for forcing the data output to a second active potential level upon the receipt of a second data item to be transmitted, a first threshold-based detector for detecting the switching of the data output from the first active level to an intermediate potential level between the two active levels, a second threshold-based detector for detecting the switching of the data output from the second active level to the intermediate potential level, an acknowledgment signal establishment circuit linked to the threshold-based detectors and establishing an acknowledgment signal on the acknowledgment output if one or the other of the detectors detects the switching from an active level to the intermediate potential level.

The threshold-based detectors are preferably able to also detect the reverse switching of the data output from the intermediate potential up to one of the active potentials and they have their outputs linked to the control circuits for interrupting the forcing of the data output to the active level after the detection of the switching of the data output to this active level.

Moreover, the threshold-based detectors are preferably linked to a circuit for holding the active potential level so as to weakly hold the potential of the data output at the active level to which it has been forced after the interruption of the forcing.

The receive interface circuit comprises a data input intended to be linked to the exchange conductor for receiving data and transmitting an acknowledgment information item destined for a sender, an acknowledgment signal input, two data outputs, a first threshold-based detector for detecting the switching of the data input from an intermediate potential level to a first active potential level and for providing a data item on the first output, a second threshold-based detector for detecting the switching of the data input from the intermediate potential level to a second active potential level and for providing a data item on the second output, and a control circuit for controlling the forcing of the data input to the intermediate potential level upon the receipt of an acknowledgment signal on the acknowledgment signal input.

Preferably, the threshold-based detectors are able to detect the switching of the data input from one of the active levels to the intermediate potential level and have their outputs linked to the control circuit so as to interrupt the forcing of the output to the intermediate level after the detection of the switching of this input to the intermediate potential.

Preferably also, the threshold-based detectors are linked to a circuit for holding the intermediate potential level so as to weakly hold the potential of the data input at the intermediate level after the interruption of the forcing of the data input to this potential.

BRIEF DESCRIPTION OF DRAWINGS

Other characteristics and advantages of the invention will become apparent on reading the detailed description which follows and which is given with reference to the appended drawings in which:

FIG. 1 represents the structure for asynchronous communication between a sender and a receiver with a single exchange conductor;

FIG. 2 represents the general timechart of the signals which allow this communication;

DETAILED DESCRIPTION

Figure 3:
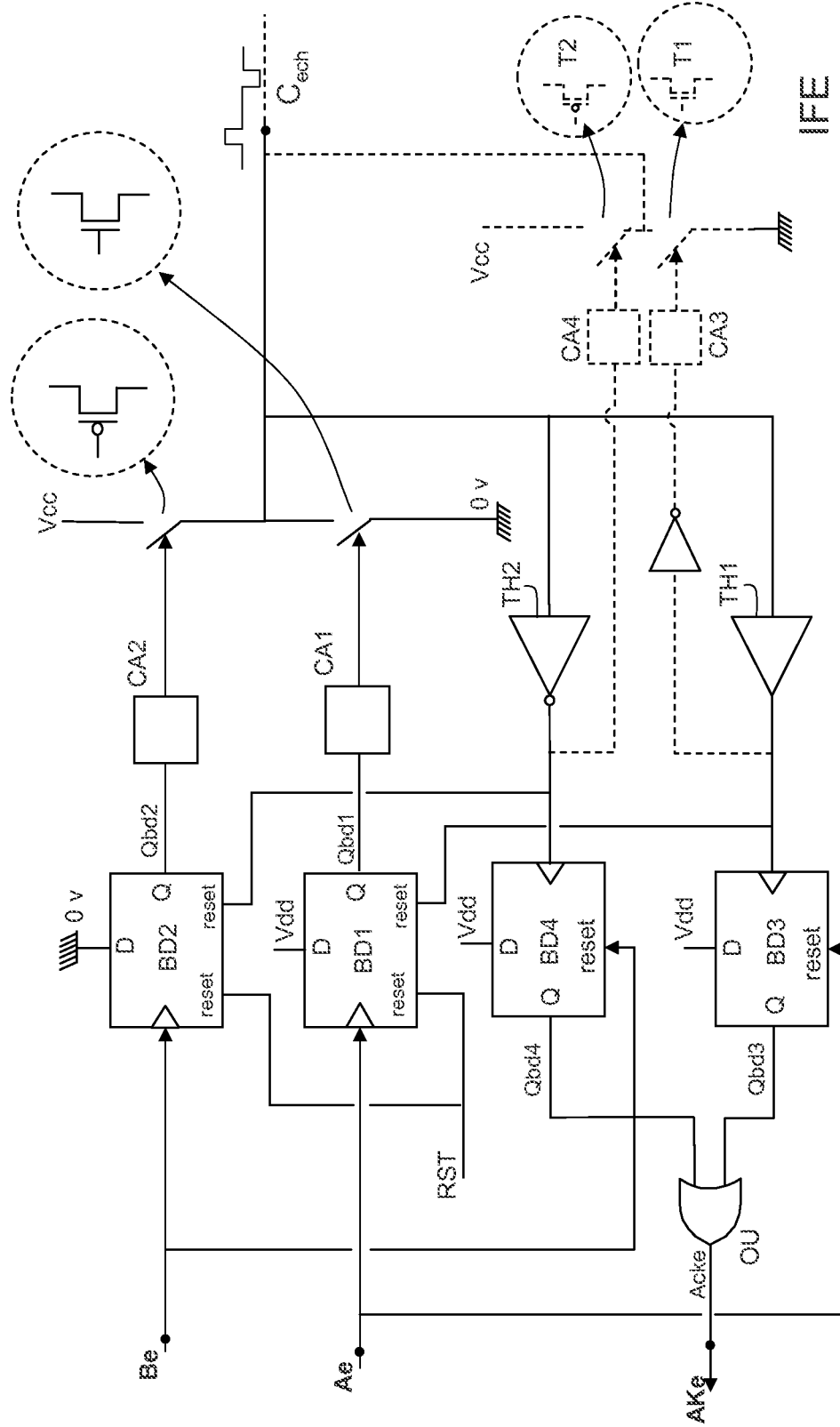
FIG. 3 represents a diagram of a send interface circuit allowing the implementation of the invention.

FIG. 1 represents the general principle of the asynchronous communication according to the invention between a sender EM and a receiver RE. The sender EM is associated with a send interface circuit IFE, and the receiver is associated with a receive interface circuit IFR. The two interface circuits IFE and IFR communicate through a single exchange conductor $C_{ech}$ which transmits one by one the binary data 0 or 1 from the sender to the receiver, and which transmits from the receiver to the sender, after each data item, an acknowledgment signal indicating that the receiver has indeed received the data item sent by the sender.

To simplify the explanations, it is assumed that the sender is connected to the send interface by three terminals which are terminals Ae, Be, and AKe, and it is assumed that the sender is supplied between a ground potential 0 volts and a general power supply potential Vdd. The terminal Ae serves to transmit the 0 logic levels from the sender to the send interface; it takes a low voltage level (Vlow) when it does not transmit any data item and a high voltage level (Vhigh) when it sends a 0 logic level. The terminal Be serves to transmit the 1 logic levels; it takes a low voltage level (Vlow) when it does not transmit any data item and a high voltage level (Vhigh) when it sends a 1 logic level. The terminal AKe transmits an acknowledgment signal Acke from the send interface to the sender EM; this signal consists for example of a high voltage level Vhigh; in the absence of any acknowledgment signal, the terminal AKe remains at the low level. The simplest is to choose the power supply voltages 0 volts and Vdd of the circuit as low and high logic levels respectively, and it will therefore be presupposed hereinafter that Vlow=0 volts and Vhigh=Vdd.

Likewise, it is assumed that the receiver is connected to the receive interface by three terminals which are terminals As, Bs, and AKs; the receiver is also supplied between a ground potential 0 volts and a general power supply potential Vdd. The terminal As serves to transmit the 0 logic levels from the receive interface to the receiver; it takes a low voltage level (here 0 volts) when it does not transmit any data item and a high voltage level (here Vdd) when it transmits a 0 logic level. The terminal Bs serves to transmit the 1 logic levels; it takes a low voltage level (0 volts) when it does not transmit any data item and a high voltage level (Vdd) when it transmits a 1 logic level. The terminal AKs transmits an acknowledgment signal Acks from the receiver to the receive interface; this signal consists for example of a high voltage level Vdd; in the absence of any acknowledgment signal, the terminal AKs remains at the low 0 volts level.

Between the send interface and the receive interface, a single exchange conductor $C_{ech}$ transmits not only the 0 and 1 data arising from the sender but also the receiver acknowledgment signal.

The exchange conductor $C_{ech}$ may be forced into one of three different states corresponding to three different potential levels forced on the conductor. These potential levels are two so-called active levels Vlow=0 and Vhigh=Vcc which may be forced on the conductor by the send interface circuit, and a third level Vmed, termed the inactive level or standby level, which may be forced on the conductor by the receive interface circuit. The inactive level is a standby level in which the exchange conductor is ready to transmit a new data item in the form of a transition to one of the two active levels.

The inactive level Vmed is preferably an intermediate level between the potentials 0 and Vcc. The potential Vmed may be a potential equal to Vcc/2 but this is not compulsory. It suffices that it be a level which can easily be distinguished (by a threshold-based detector) with respect to 0 and Vcc. In integrated circuits in which two different power supply potentials Vcc and Vdd are employed, with Vcc greater than Vdd (for example 1.8 volts and 1.2 volts), the intermediate potential may be the potential Vdd, lower than Vcc. In a circuit in which two different power supply potentials Vdd and Vaa, lower than Vdd, are employed (for example 1.2 volts and 0.7 volts), the intermediate potential may be the potential Vaa and the high active potential may be Vdd. In a circuit in which a symmetric power supply +Vdd, −Vdd and a ground terminal at 0 volts were employed, the two active potentials would be −Vdd, +Vdd and the inactive potential Vmed would be 0 volts.

Finally, it will be noted that the potential Vcc which constitutes one of the active levels present on the exchange conductor could be different from the potential Vdd which defines the high logic level on the terminals Ae and Be of the sender or on the terminals As and Bs of the receiver; it will be understood that it will often be easier to use the same potential Vdd for these two functions and it will be presupposed hereinafter that this is the case.

FIG. 2 represents the general timechart of the asynchronous exchange protocol which allows this communication on a single conductor.

The lines of the diagram represent the evolution of the potential on the terminals Be, Ae, and AKe connecting the sender EM to the send interface circuit IFE; then the potential on the exchange conductor; and then the potentials on the terminals Bs, As, and AKs connecting the receive interface circuit IFR to the receiver RE. The arrows indicate the causalities, that is to say which level transition gives rise to which other transition.

It is considered that the sender firstly sends a 1 logic level, which results in a switching from 0 to Vdd of the potential on the terminal Be (left part of FIG. 2); and then, after a standby phase, it sends a 0 logic level, resulting in a switching from 0 to Vdd of the potential on the terminal Ae (right part of FIG. 2).

In a standby situation awaiting the sending a data item by the sender, the exchange conductor is at the inactive potential level which is the intermediate potential Vmed; it is held at this value in a weak manner by the receive interface circuit which has set it to this value during a previous exchange of data. The holding is weak in the sense that the conductor is at high impedance (capacitive holding) or linked to a voltage source by a weak circuit (small transistor), but it may be easily forced to another potential (0 or Vcc) by the send interface circuit (possessing for example a control circuit with a bigger transistor).

For the sending of a 1 logic level, the sender causes the terminal Be to switch from the 0 potential level to the level Vdd. The send interface circuit IFE detects this transition and briefly forces the exchange conductor to an active level which is a high voltage level Vcc, and then relaxes this constraint so that the conductor can be held in a weak manner at Vcc and can thereafter be forced to the inactive level by the receive interface circuit.

The receive interface IFR detects this switching to the high level of the exchange conductor and establishes a high level (Vdd) on the output terminal Bs which was at 0 volts beforehand; the receiver detects this high level and uses it (according to the function that the receiver has to fulfill in the system which uses this data communication). The receiver then sends on the terminal AKs the acknowledgment signal Acks, destined for the receive interface circuit. The signal Acks is a switching from the initially low level to the high level Vdd on the terminal AKs.

On receipt of this transition, the receive interface circuit IFR then briefly forces the exchange conductor to the intermediate level Vmed, and then relaxes the constraint on this potential. The exchange conductor is then held at this potential Vmed, in a weak manner. The return of the exchange conductor from the active level to the inactive level Vmed constitutes an acknowledgment signal from the receive interface circuit to the send interface circuit. Moreover, the transition from 0 to Vdd on the terminal AKs triggers the interruption of the signal Bs; the 1 data item having been recorded in the receiver, the latter can be preparing to receive a new data item. The stopping of the signal Bs thereafter triggers the stopping of the signal Acks, the terminal AKs therefore reverting to 0. The receive interface circuit is then ready to receive a new data item.

The acknowledgment signal consisting of the return of the exchange conductor to the potential Vmed is detected by the send interface circuit IFE. The latter then establishes on the terminal AKe an acknowledgment signal Acke destined for the sender EM. The signal Acke may be a rising edge from the 0 volts level to the Vdd level on the terminal AKe.

The rising edge of the signal Acke causes in the sender the disabling of the data item on the terminal Be, that is to say it triggers in the sender the interruption of the application of a level Vdd on the terminal Be; this signifies that the 0 data item has indeed been transmitted and that the sender can prepare itself for a new data item sending. The terminal Be switches back to the 0 volts level, after which the signal Acke stops, that is to say the terminal AKe switches back to 0 volts. The send interface circuit is then ready to receive a new data item from the sender.

The protocol is the same for the transmission of a 0 logic level (right part of FIG. 1):

The exchange conductor is initially at the level Vmed where it has been forced by the receive interface circuit.

For the sending of a 0 logic level, the sender causes the terminal Ae to switch from the 0 potential level to the level Vdd. The send interface circuit IFE detects this transition and briefly forces the exchange conductor to a high voltage level Vcc, and then relaxes this constraint so that the conductor can be held in a weak manner at Vcc and can thereafter be forced to another level by the receive interface circuit.

The receive interface IFR detects this switching to the high level of the exchange conductor and establishes a high level (Vdd) on the output terminal As which was at 0 volts beforehand; the receiver detects this high level and uses it according to the function which is assigned to it in the electronic system which uses this data communication. The receiver then sends on the terminal AKs the acknowledgment signal Acks destined for the receive interface circuit. The signal Acks is a switching from the initially low level to the high level Vdd on the terminal AKs.

On receipt of this transition, the receive interface circuit IFR then briefly forces the exchange conductor to the intermediate level Vmed, and then relaxes the constraint on this potential. The exchange conductor is held at this potential Vmed, in a weak manner. The return of the exchange conductor to the level Vmed constitutes an acknowledgment signal from the receive interface circuit to the send interface circuit. Moreover, the transition from 0 to Vdd on the terminal AKs triggers the interruption of the signal As, that is to say the 0 data item has been recorded in the receiver, the latter being able to prepare to receive a new data item. The stopping of the signal As moreover triggers the stopping of the signal Acks, the terminal AKs therefore reverting to 0.

The acknowledgment signal consisting of the return of the exchange conductor to the potential Vmed is detected by the send interface circuit IFE. The latter then establishes on the terminal AKe an acknowledgment signal Acke destined for the sender EM. The signal Acke is again a rising edge from the 0 volts level to the level Vdd on the terminal AKe.

The rising edge of the signal Acke causes in the sender the disabling of the data item on the terminal Ae, that is to say it triggers in the sender the interruption of the application of a level Vdd on the terminal Ae; this signifies that the 0 data item has indeed been transmitted and that the sender can prepare for a new data item sending. The terminal Ae switches back to the 0 volts level, after which the signal Acke stops, that is to say the terminal AKe switches back to 0 volts.

FIG. 3 represents a basic diagram of the send interface circuit that may be used to implement the invention. It comprises two data inputs Ae and Be, a data output (to an exchange conductor $C_{ech}$), and an acknowledgment signal output AKe.

The input Ae is connected to the enabling input of a first flip-flop BD1 which is a D-type flip-flop whose function is to echo on its Q output the logic state of its D input upon the reception of a rising edge on the enabling input. The D input of the flip-flop BD1 is at Vdd. On a rising edge on Ae, the Q output ($Q_{bd1}$), initially at the low level, switches to the high logic level. An adaptation circuit CA1 receives the output $Q_{bd1}$ of the flip-flop BD1 and then instructs the application of a 0 voltage (low level) on the exchange conductor $C_{ech}$. This voltage is applied by way of a breaker which may consist for example of an NMOS transistor, the circuit CA1 providing a high logic level to turn on this transistor.

Likewise, the input Be is connected to the enabling input of a second flip-flop BD2 which is a D flip-flop whose D input is at a low logic level. During a rising edge on Be, the flip-flop BD2 echoes on its output $Q_{bd2}$ (initially at the high level) this low level. An adaptation circuit CA2 receives the output $Q_{bd2}$ of the flip-flop BD2 and then instructs the application of a high voltage Vcc on the exchange conductor. This voltage is applied by way of a breaker which may consist for example of a PMOS transistor, the circuit CA2 providing a low logic level to turn on this transistor.

The circuits CA1 and CA2 also carry out the level translations, if any, required between the flip-flops which have the same power supplies as the sender and the circuits linked to the exchange conductor.

The flip-flops are then reset to an initial state subsequent to the change of state of the exchange conductor, that is to say the switching of the exchange conductor to the low level is detected and resets the flip-flop BD1 to its initial state (Q output at 0), and likewise, the switching of the exchange conductor to the high level resets the flip-flop BD2 to its initial state (output Q=1). In their initial state, the flip-flops BD1 and BD2 relax the forcing of the potential on the exchange conductor; they leave it at high impedance or hold it weakly at the value to which they have forced it.

The resetting of the flip-flops is carried out by virtue of two threshold-based detectors TH1 and TH2 which are linked to the exchange conductor. The detector TH1 detects the switching of the exchange conductor to 0. Its output is linked to a reset input of the flip-flop BD1. Likewise, the detector TH2 detects the switching of the exchange conductor to Vdd. Its output is linked to a reset input of the flip-flop BD2.

The circuits TH1 and TH2 also carry out the level translations, if any, required between the flip-flops and the exchange conductor.

Moreover when the exchange conductor is subsequently forced to revert to its inactive level Vmed (by the receive interface circuit), the same threshold-based detectors (but they could be other detectors) are used to bring about an acknowledgment signal Acke on the terminal AKe. This is achieved on the basis of two other D flip-flops, BD3 and BD4, and a logic gate combining the outputs of these two flip-flops. The flip-flop BD3 receives on its enabling input the output of the threshold-based detector TH1; it is configured to react to the detection by the detector TH1 of the switching of the exchange conductor from 0 to Vmed. The flip-flop BD3 has its D input at Vdd and an output $Q_{bd3}$; it has moreover a resetting input receiving the signal on the input Ae and resetting the Q output to zero on the falling edge of the signal on the input Ae (therefore at the end of the sending of a data item). The flip-flop BD4 is configured in a similar manner; its D input is at Vdd but it receives on its enabling input the output of the threshold-based detector TH2 and on its resetting input the signal on the input Be. The outputs $Q_{bd3}$ and $Q_{bd4}$ of the flip-flops BD3 and BD4 are combined in an OR gate.

In the absence of any data item on the input Ae or Be the flip-flops BD3 and BD4 provide a 0 level on their output. The logic gate, here an OR gate, provides a 0 level.

After the sending of the start of a data item on the terminal Ae, and reception by the receive interface circuit, the return of the exchange conductor from 0 to Vmed, detected by the detector TH1, causes the output of the flip-flop BD3 to switch to Vdd. The OR logic gate then provides a signal Acke on the output AKe. This signal is used by the sender upstream of the send interface circuit of FIG. 3 to interrupt the data item on the terminal Ae. This interruption resets the flip-flop BD3 to 0, interrupting the signal Acke.

Likewise, after the sending of the start of a data item on the terminal Be, and reception by the receive interface circuit, the return of the exchange conductor from Vcc to Vmed, detected by the detector TH2, causes the output of the flip-flop BD4 to switch to Vdd. The OR logic gate further provides a signal Acke on the output AKe. This signal is used by the sender to interrupt the data item on the terminal Be. This interruption resets the flip-flop BD4 to 0, interrupting the signal Acke.

An input RST makes it possible to initialize the flip-flops BD1 and BD2 at the start to prevent them from being in a random state before the appearance of a first data item and from forcing the exchange conductor to an undesired potential level. The flip-flops BD1 and BD2 are represented for simplicity as each having two resetting inputs, but it is of course possible to envisage flip-flops with a single resetting input and a logic circuit combining the signals RST and the outputs of the detectors TH1 or TH2 so as to establish the resetting signal.

The weak holding of the exchange conductor at 0 or at Vdd by transistors of small size T1 and T2 is represented by dashes in FIG. 3. These transistors are controlled by the output of the detectors TH1 and TH2 through the adaptation circuits, respectively CA3 and CA4. The transistor T1 holds the exchange conductor at 0 when the detector TH1 provides a signal regarding detection of the switching of this conductor to 0. It ceases this holding when the exchange conductor is forced to Vmed by the receive interface circuit. The transistor T2 holds the exchange conductor at Vcc when the detector TH2 provides a signal regarding detection of the switching of this conductor to Vcc. It ceases this holding when the exchange conductor is forced to Vmed by the receive interface circuit. The transistors T1 and T2 are smaller than the transistor (represented by a breaker in FIG. 5) which, in the receive interface circuit, serves to force the exchange conductor to Vmed. The reason for this difference in size is, as has been stated above, to allow the forcing of the exchange conductor to Vmed by the receive interface circuit despite this holding by the transistors T1 and T2 on the sending side.

Figure 4:
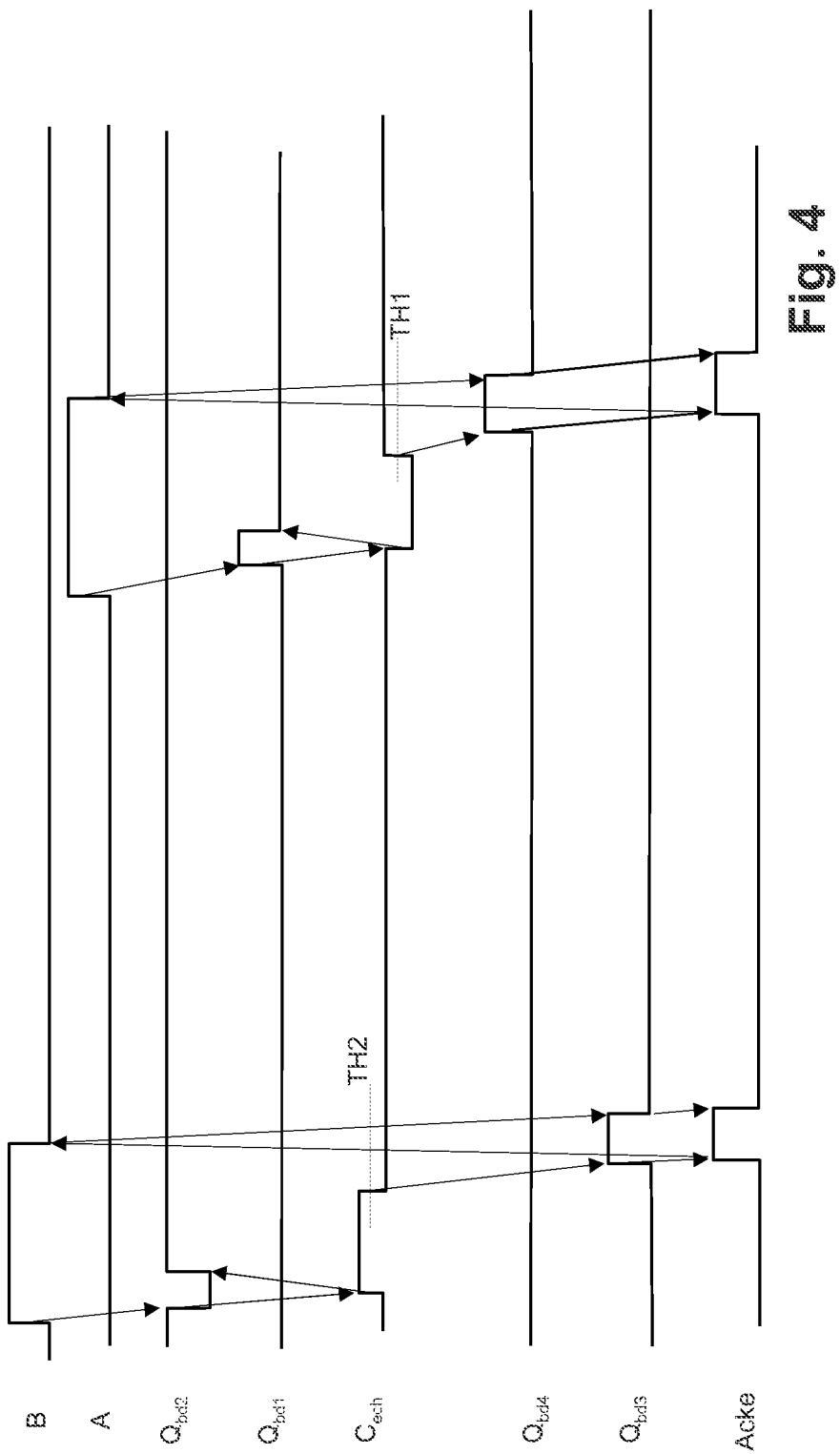
FIG. 4 represents the timechart of the signals implemented in the diagram of FIG. 3.

FIG. 4 represents the timechart of the togglings described in conjunction with FIG. 3, during the sending of a data item on the terminal Be and then during the sending of a data item on the terminal Ae. The arrows recall the causalities indicated hereinabove.

Figure 5:
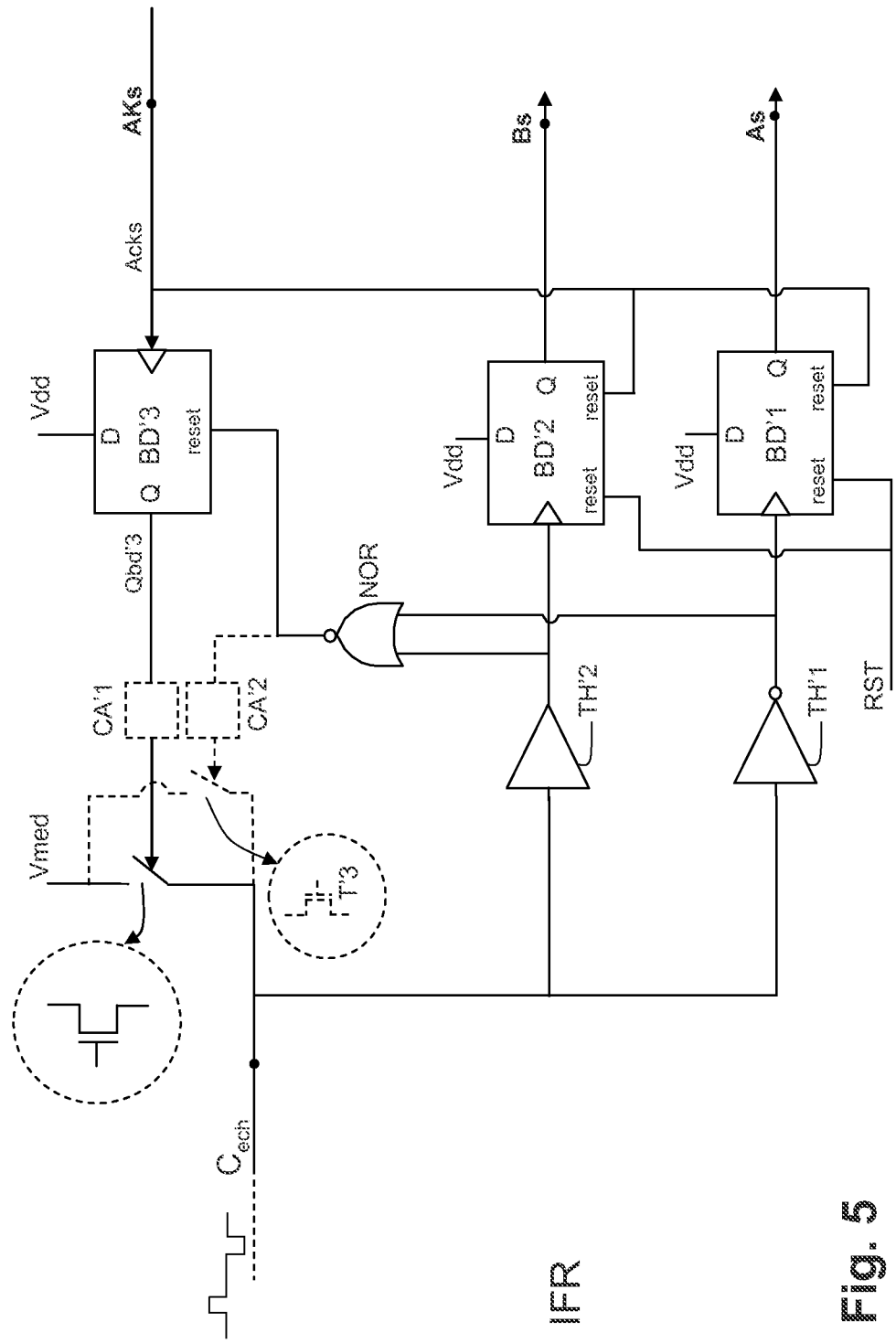
FIG. 5 represents a diagram of a receive interface circuit allowing the implementation of the invention.

FIG. 5 represents an exemplary embodiment of the receive interface circuit IFR. It comprises two data outputs As and Bs, a data input (for data originating from the exchange conductor $C_{ech}$), and an acknowledgment signal input AKs.

The exchange conductor is linked to the inputs of two threshold-based detectors TH'1 and TH'2 similar to the detectors TH1 and TH2. The function of the first is to detect in one direction the switching of the exchange conductor from the inactive potential level Vmed to the 0 volts low active level and in the other direction the return from the low level to the inactive level; it therefore detects firstly the sending of a 0 data item originating from the sender, and then in the reverse direction it detects the forcing of the exchange conductor to the inactive level with a view to relaxing this forcing. The function of the second is to detect in one direction the switching of the exchange conductor from the inactive potential level Vmed to the high active level Vcc, and then, in the other direction the return to the inactive level; it detects the sending of a 1 data item, and then the forcing to the inactive level with a view to authorizing the relaxation of this forcing.

The circuits TH'1 and TH'2 also carry out the level translations, if any, required between the flip-flops and the exchange conductor.

The detector TH'1 is linked to the enabling input of a D flip-flop BD'1. In the case of detection of a 0 data item, the flip-flop transmits on its Q output the level Vdd applied permanently on its D input. The Q output is linked to the terminal As. The terminal As therefore takes the logic level Vdd when a 0 data item is detected on the exchange conductor.

The detector TH'2 is linked to the enabling input of a D flip-flop BD'2. In the case of detection of a 1 data item, the flip-flop transmits on its Q output the level Vdd applied permanently on its D input. The Q output is linked to the terminal Bs. The terminal Bs therefore takes the logic level Vdd when a 1 data item is detected on the exchange conductor.

The receiver circuit receiving the 0 data item on the terminal As or a 1 data item on the terminal Bs formulates an acknowledgment signal Acks on the terminal AKs, in the form of a level Vdd, the terminal AKs normally being quiescent at the 0 level.

The terminal AKs is linked to the enabling input of a D-type flip-flop BD'3 whose role is firstly to instruct the forcing of the exchange conductor to the inactive level and then to relax this forcing. The output $Q_{bd'3}$ of the flip-flop is initially at the 0 logic level where it was placed when the inactive level was detected on the exchange conductor (relaxed state). When the terminal AKs receives from the sender an acknowledgment signal, that is to say a level Vdd (independently of the fact that the data item transmitted was a 0 or a 1), the flip-flop transmits the level Vdd of its D input to its output $Q_{bd'3}$. The latter then instructs, via an adaptation circuit CA'1, the forcing of the exchange conductor to the inactive level Vmed, by closing the breaker which links the exchange conductor to the potential Vmed. This breaker is in practice a MOS transistor. The exchange conductor therefore switches from the active level (0 or Vdd) to Vmed, thereby constituting the acknowledgment information item destined for the send interface circuit.

The threshold-based detector TH'1 or TH'2 which had detected the presence of an active level detects the disappearance of this active level since the exchange conductor has reverted to the level Vmed. A NOR logic gate receives the outputs of the two detectors TH'1 and TH'2 and provides at this moment a logic transition from the low level to the high level since the outputs of the two detectors have then both reverted to the 0 level and the function of a NOR gate is to give a 1 level when the two inputs are at 0. The output of the NOR gate is applied to a reset input of the flip-flop BD'3 to reinitialize the output of the latter to 0 and consequently open the breaker so as to relax the constraint for forcing the exchange conductor to Vmed. This relaxation of the forcing does not modify the potential of the exchange conductor; the latter remains at the inactive level Vmed, but the relaxation permits the subsequent forcing of the exchange conductor to an active level by the send interface circuit. The output of the NOR gate will switch automatically to zero under the action of one of the two detectors TH'1, TH'2 upon the arrival of a next data item.

After the relaxation, the exchange conductor is preferably weakly held at Vmed by a holding circuit, represented by dashes in FIG. 5, comprising a transistor T'3 controlled by the output of the NOR gate via an adaptation circuit CA'2. This transistor is smaller than the transistors (represented by breakers in FIG. 3) which force the exchange conductor to 0 or Vdd upon the sending of a data item.

The acknowledgment signal Acks arising from the receiver also serves for resetting the flip-flops BD'1 and BD'2 so as to reinitialize the terminals As and Bs to zero after the receiver has confirmed (by the acknowledgment signal Acks) that it has indeed taken into account the data item received.

Finally, an input RST makes it possible to initialize the flip-flops BD'1 and BD'2 at the start so as to prevent them from being in a random state before the appearance of a first data item. Provision may also be made to initially force the exchange conductor to the potential Vmed, this forcing being followed by a relaxation induced by the detectors TH'1 and TH'2.

Figure 6:
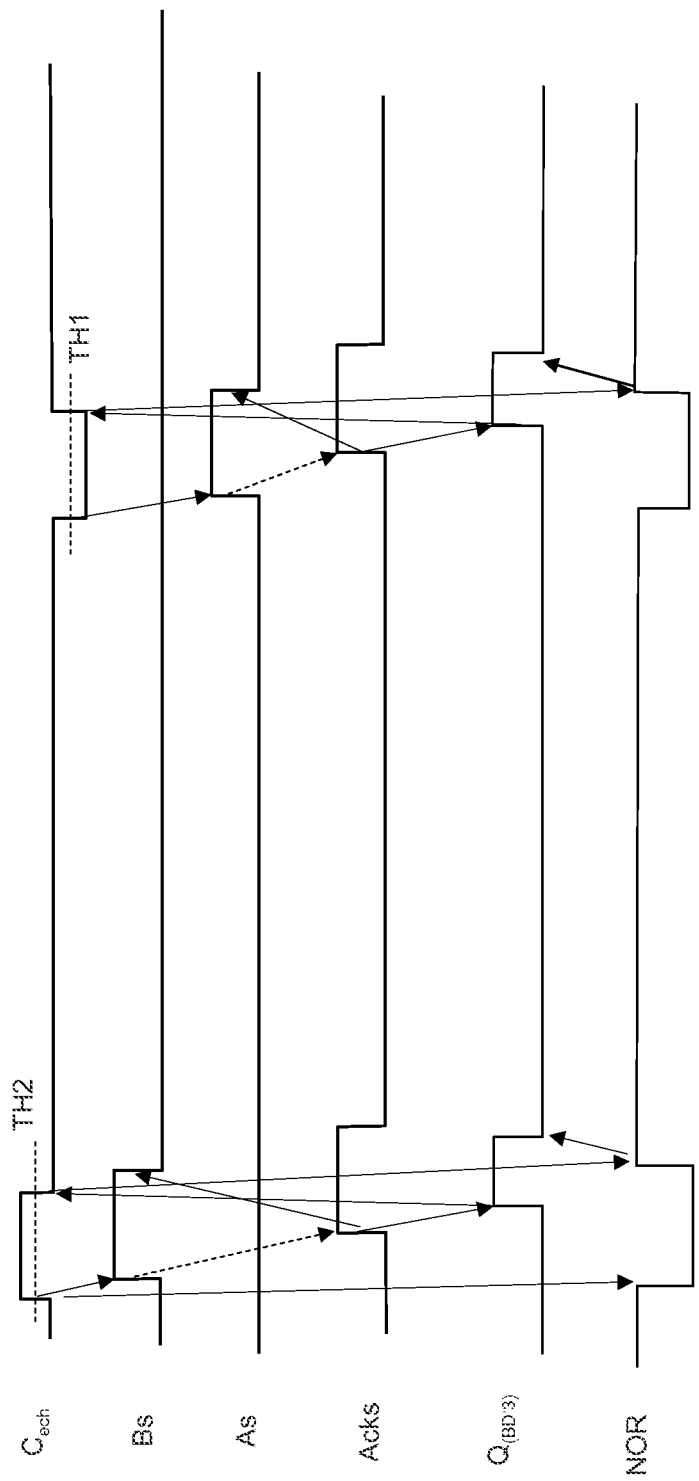
FIG. 6 represents the timechart of the signals implemented in the diagram of FIG. 5.

FIG. 6 represents the timechart of the togglings described in conjunction with FIG. 5, upon the receipt of a 0 data item and then of a 1 data item on the exchange conductor.

Figure 7:
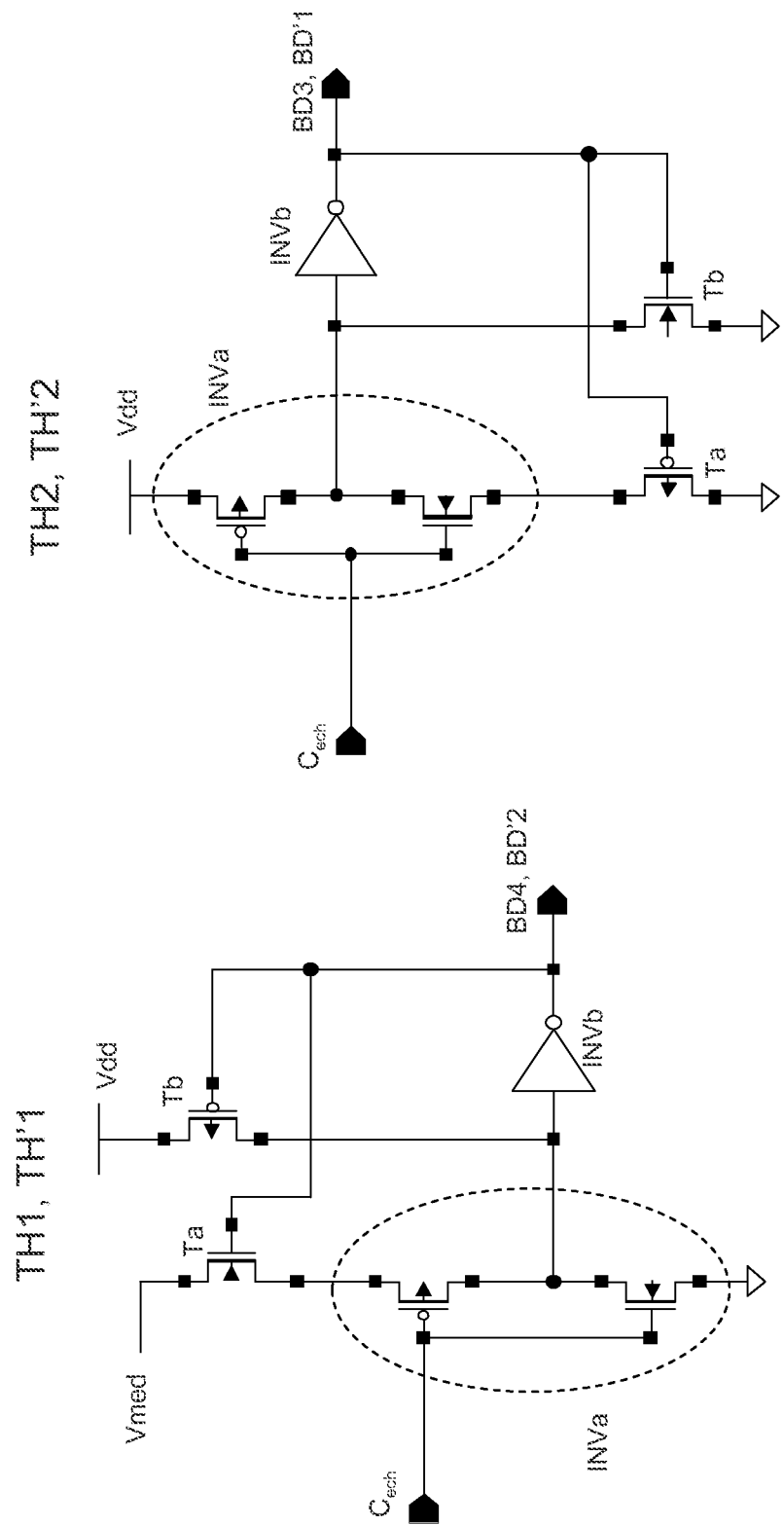
FIG. 7 represents electronic diagrams of threshold-based circuits used in the send and receive interface circuits.

FIG. 7 represents a possible construction for the threshold-based detectors TH1, TH'1 and TH2, TH'2, in the case of a voltage Vmed which is less than Vdd. They are hysteresis-type detectors so as to avoid an instability and exhibiting the lowest possible static consumption. They each comprise an input inverter INVa in series with an output inverter INVb. The inverters consist conventionally of a pair of NMOS and PMOS transistors in series with their drains linked and their gates linked. The inverter INVa receives on the gates the voltage present on the exchange conductor. It is energized through a transistor Ta, in series with the pair of transistors; the transistor Ta is turned on for a determined state of the output of the inverter INVb.

In the case of TH1 and TH'1, which have to detect the switching of the exchange conductor from Vmed to zero and then from 0 to Vmed, the transistor Ta is an NMOS transistor linked to a potential Vmed. This transistor is turned on when the output of the inverter INVb is at 1, that is to say when the input of the inverter INVa is at 1, therefore when the exchange conductor is at Vmed. When the exchange conductor falls below a toggling threshold potential of the inverter INVa, the latter toggles, causes the inverter INVb to toggle, thereby setting the output of the latter to 0, turning off the transistor Ta, thereby isolating the inverter INVa from the potential Vmed. A PMOS transistor Tb loops the output of the inverter INVb back to its input; it is turned on by the fact that the output is at 0. The state of the output of the detector is held as long as the voltage on the exchange conductor does not rise back above the threshold. When the voltage exceeds the threshold, it causes the inverter INVa to toggle which causes the inverter INVb to toggle in its turn.

Likewise, in the case of TH2 and TH'2, which have to detect the switching of the exchange conductor from Vdd to Vmed or from Vmed to Vdd, the transistor Ta is a grounded PMOS transistor. This transistor is turned on when the output of the inverter INVb is at 0, that is to say when the input of the inverter INVa is at 0, therefore when the exchange conductor is at Vmed (the voltage Vmed being insufficient to cause the inverter INVa to toggle). When the exchange conductor rises above a toggling threshold situated between Vmed and Vdd, the inverter INVa toggles, causes the inverter INVb to toggle, thereby setting the output of the latter to 1, turning off the transistor Ta, thereby isolating the inverter INVa from the ground. An NMOS transistor Tb loops the output of the inverter INVb back to its input; it is turned on by the fact that the output is at 1. The state of the output of the detector is held as long as the voltage on the exchange conductor does not fall back below the threshold.

A send and receive interface circuit has thus been described, allowing asynchronous communication through a single connection wire through which the data and an acknowledgment information item travel.

The invention claimed is:
1. A method of data transfer by an asynchronous link, comprising:
   transmitting a data item from a sender to a receiver;
   receiving an acknowledgment signal in return from the receiver to the sender,
      wherein the data item and the acknowledgement signal are transmitted on an exchange conductor in at least three levels of potential, a first level of potential representing a first value of data item transmitted, a second level of potential representing an inactive potential level, and a third level of potential representing a second value of data item transmitted,
      wherein the acknowledgment signal is produced by the receiver by forcing the exchange conductor, by the receiver, to the inactive potential level, and the sender detecting said forcing of the exchange conductor; and
      in succession:
         forcing, by the sender of the data item, the exchange conductor to an active potential level;
         relaxing, by the sender of the data item, the forcing of the exchange conductor and the receiver detecting the active potential level;
         forcing, by the receiver, the exchange conductor to the inactive potential level, the switching of the exchange conductor from the active potential level to the inactive potential level constituting the acknowledgment signal; and
         relaxing, by the receiver, the forcing of the exchange conductor and the sender detecting the switching of the exchange conductor to the inactive potential level.

2. The method as claimed in claim 1, wherein the switching of the exchange conductor to the inactive potential level is detected by the receiver which thereafter relaxes said forcing of the exchange conductor.

3. The method as claimed in claim 2, wherein the detection by the sender of the switching to the inactive potential level engenders a signal for disabling the data item for later transmission of a new data item.

4. A send interface circuit for a single wire asynchronous communication, comprising:
   first and second inputs for reception of data to be transmitted;
   an acknowledgment output for sending an acknowledgment signal;
   a data output configured to be linked to a single wire exchange conductor to transmit the data and receive an information item regarding acknowledgment from a receiver interface connected to the single wire;
   a first control circuit linked to the first input configured to force the data output to a first active potential level upon a receipt of a first data item to be transmitted;
   a second control circuit linked to the second input configured to force the data output to a second active potential level upon a receipt of a second data item to be transmitted;
   means for relaxing said forcings of the data output;
   a first threshold-based detector configured to detect switching of the data output from the first active potential level to an intermediate potential level;
   a second threshold-based detector configured to detect switching of the data output from the second active potential level to the intermediate potential level; and
   an acknowledgment signal establishment circuit linked to the first and second threshold-based detectors and configured to establish an acknowledgment signal on the acknowledgment output when one or the other of the first and second threshold-based detectors detects the switching from the active potential level to the intermediate potential level.

5. The send interface circuit as claimed in claim 4, wherein the first and second threshold-based detectors are also configured to detect reverse switching of the data output from the intermediate potential up to one of the active potentials, and to have their outputs linked to the first and second control circuits for interrupting the forcing of the data output to the active potential level after the detection of the switching of the data output to the active potential level.

6. The send interface circuit as claimed in claim 5, wherein the first and second threshold-based detectors are linked to a circuit configured to hold the active potential level to weakly hold the potential of the output at its forced active potential level after the interruption of the forcing.

7. A receive interface circuit for a single wire asynchronous communication, comprising:

a data input configured to be linked to a single wire exchange conductor for communication with a sender interface;
an acknowledgment signal input;
first and second data outputs;
a first threshold-based detector configured to detect switching of the data input from an intermediate potential level to a first active potential level and to provide a data item to the first data output;
a second threshold-based detector configured to detect switching of the data input from the intermediate potential level to a second active potential level and to provide a data item to the second data output;
a control circuit configured to control forcing of the data input to the intermediate potential level upon receipt of an acknowledgment signal on the acknowledgment signal input; and
means for relaxing said forcing.

8. The receive interface circuit as claimed in claim 7, wherein the first and second threshold-based detectors are also configured to detect switching of the data input from one of the active potential levels to the intermediate potential level and have their outputs linked to the control circuit to interrupt the forcing of the data input to the intermediate level after the detection of the switching of the data input to the intermediate potential level.

9. The receive interface circuit as claimed in claim 8, wherein the first and second threshold-based detectors are linked to a circuit configured to hold the intermediate potential level to weakly hold the potential of the data input at the intermediate potential level after the interruption of the forcing of the data input to the intermediate potential level.

* * * * *